(12) United States Patent
Bailey et al.

(10) Patent No.: US 7,539,280 B2
(45) Date of Patent: May 26, 2009

(54) NUCLEAR FUEL ROD LOADING METHOD AND APPARATUS

(75) Inventors: William E. Bailey, Lynchburg, VA (US); J. Todd Lee, Forest, VA (US)

(73) Assignee: AREVA NP Inc., Lynchburg, VA (US)

( * ) Notice: Subject to any disclaimer, the term of this patent is extended or adjusted under 35 U.S.C. 154(b) by 0 days.

(21) Appl. No.: 11/131,680

(22) Filed: May 17, 2005

(65) Prior Publication Data

US 2006/0285626 A1    Dec. 21, 2006

(51) Int. Cl.
*G21C 19/00* (2006.01)

(52) U.S. Cl. .................. 376/261; 376/268; 376/248; 376/260

(58) Field of Classification Search .................. 376/261, 376/260, 245, 248, 268
See application file for complete search history.

(56) References Cited

U.S. PATENT DOCUMENTS

| | | | | |
|---|---|---|---|---|
| 3,735,550 A | * | 5/1973 | Moore et al. | 53/432 |
| 4,158,601 A | * | 6/1979 | Gerkey | 414/146 |
| 4,292,788 A | * | 10/1981 | King | 53/500 |
| 4,748,798 A | * | 6/1988 | Udaka et al. | 53/504 |
| 4,980,119 A | * | 12/1990 | Schoenig et al. | 376/261 |
| 6,014,418 A | * | 1/2000 | Isobe et al. | 376/261 |
| 6,327,320 B1 | * | 12/2001 | Hunter | 376/260 |
| 6,639,961 B2 | * | 10/2003 | Bailey et al. | 376/268 |

OTHER PUBLICATIONS

WordNet 2.1, 2005 Princeton University, from http://dictionary.refernce.com/help/wn.html, accessed Jan. 19, 2007.*

* cited by examiner

*Primary Examiner*—Rick Palabrica
(74) *Attorney, Agent, or Firm*—Kenyon & Kenyon LLP

(57) ABSTRACT

A method to load a nuclear fuel rod, comprising, providing nuclear fuel pellets in a fuel plate transfer unit; transferring the nuclear fuel pellets from the fuel plate transfer unit to a fuel pellet column through the use of a belt, indexing the nuclear fuel pellets in the fuel pellet column to a nuclear fuel pellet loading machine; and pushing the fuel pellet column into a fuel rod cladding.

8 Claims, 7 Drawing Sheets

NUCLEAR FUEL ROD LOADING METHOD AND APPARATUS

FIELD OF THE INVENTION

The present invention relates to nuclear fuel assemblies. More specifically, the present invention provides a method and device to load a nuclear fuel rod for a nuclear fuel assembly.

BACKGROUND INFORMATION

Production for nuclear fuel assemblies requires significant care during fabrication. The fabrication steps taken for such fuel assemblies is often costly and complicated due to the amount of precautionary steps that are required. Nuclear fuel rods are designed with several different components, wherein each of the components having a specific design purpose. The fissionable component of each nuclear fuel rod is generally a uranium enriched ceramic material (a uranium oxide) that is shaped in the form of a pellet. Individual pellets are placed end to end to form a fuel column. The fuel column is then inserted into an elongated rod made of corrosion resistant metal, such as a zirconium alloy, called a fuel clad. The fuel column is protected from mechanical and chemical wear by the fuel clad. The fuel clad protects the fuel column during operation of the reactor as well as handling of the fuel assembly. As an additional precaution, springs and/or other devices are also included inside the volume encapsulated by the fuel clad to allow the uranium fuel elements to swell and shift within prescribed limits in the fuel clad. This allows the fuel column to withstand several different loading scenarios without detrimental effects to the fuel column. The completed fuel rods are then stored. Completed fuel rods are then placed in a parallel arrangement, called a fuel assembly, to prevent the fuel rods from contacting each other during use.

In current automated loading systems, nuclear fuel pellets are taken from a fuel pellet elevator and transferred by a conveyor in a tray to a segment make-up table. The fuel pellets are removed from the fuel pellet tray by a worker and placed on the table. The fuel pellets are placed in a parallel orientation and then compacted by a pusher device to form columns of uranium containing ceramic material. The pushing device is connected to a linear variable displacement transducer which is configured to provide an electrical output signal. The electrical output signal is then read by a computer and an overall length of the individual fuel element column is determined. A computer then compares an overall design specification for the fuel rod with the overall length determined from the output signal. If the difference between the expected design value of the nuclear fuel element column length and the measured value meets a predetermined threshold value, the fuel rod cladding is then loaded with the nuclear pellet column. If the overall length of the fuel pellet column is outside of the threshold value, the fuel pellets are then rejected from the segment make-up table. A top end cap is then welded on the existing open side of the fuel rod cladding thereby completing the nuclear fuel rod.

There is a need to provide an apparatus and method which will enable an operator to perform additional quality assurance checks of the nuclear fuel elements during the manufacturing process of a nuclear fuel rod.

There is also a need to provide a method and device to load nuclear fuel pellets into a nuclear fuel rod in a safe, economical and non-damaging manner.

There is a further need to provide a method and device which will load cylindrical fuel pellets into an open fuel rod clad, i.e. a fuel rod clad without a lower plug welded to the fuel clad.

There is a further need to provide a method and device which will allow cylindrical fuel pellets to be loaded into an open fuel rod clad to eliminate slow insertion speeds for pellet placement found in existing methods and systems.

SUMMARY

It is therefore an objective of the present invention to provide a method and device to load pellets into a nuclear fuel rod for a nuclear fuel assembly.

It is also an objective of the present invention to provide a method and device to load nuclear fuel pellets into a nuclear fuel rod in a safe, economical and non-damaging manner.

It is also an objective of the present invention to provide a method and device which will load cylindrical fuel pellets into an open fuel rod clad.

It is a further objective of the present invention to provide a method and device which will allow cylindrical fuel pellets to be loaded into an open fuel rod clad to eliminate slow insertion speeds for pellet placement found in existing methods and systems.

The objectives of the present invention are achieved as illustrated and described. The present invention provides a method to load a nuclear fuel rod, comprising the steps of providing nuclear fuel pellets in a fuel plate transfer unit, transferring the nuclear fuel pellets from the fuel plate transfer unit to a fuel pellet column through the use of a belt; indexing the nuclear fuel pellets in the fuel pellet column to a nuclear fuel pellet loading machine, and pushing the fuel pellet column into a fuel rod cladding. The indexing the nuclear fuel pellets in the fuel pellet column to a nuclear fuel pellet loading machine can be performed through a v-trough station.

DETAILED DESCRIPTION

Figure 1:
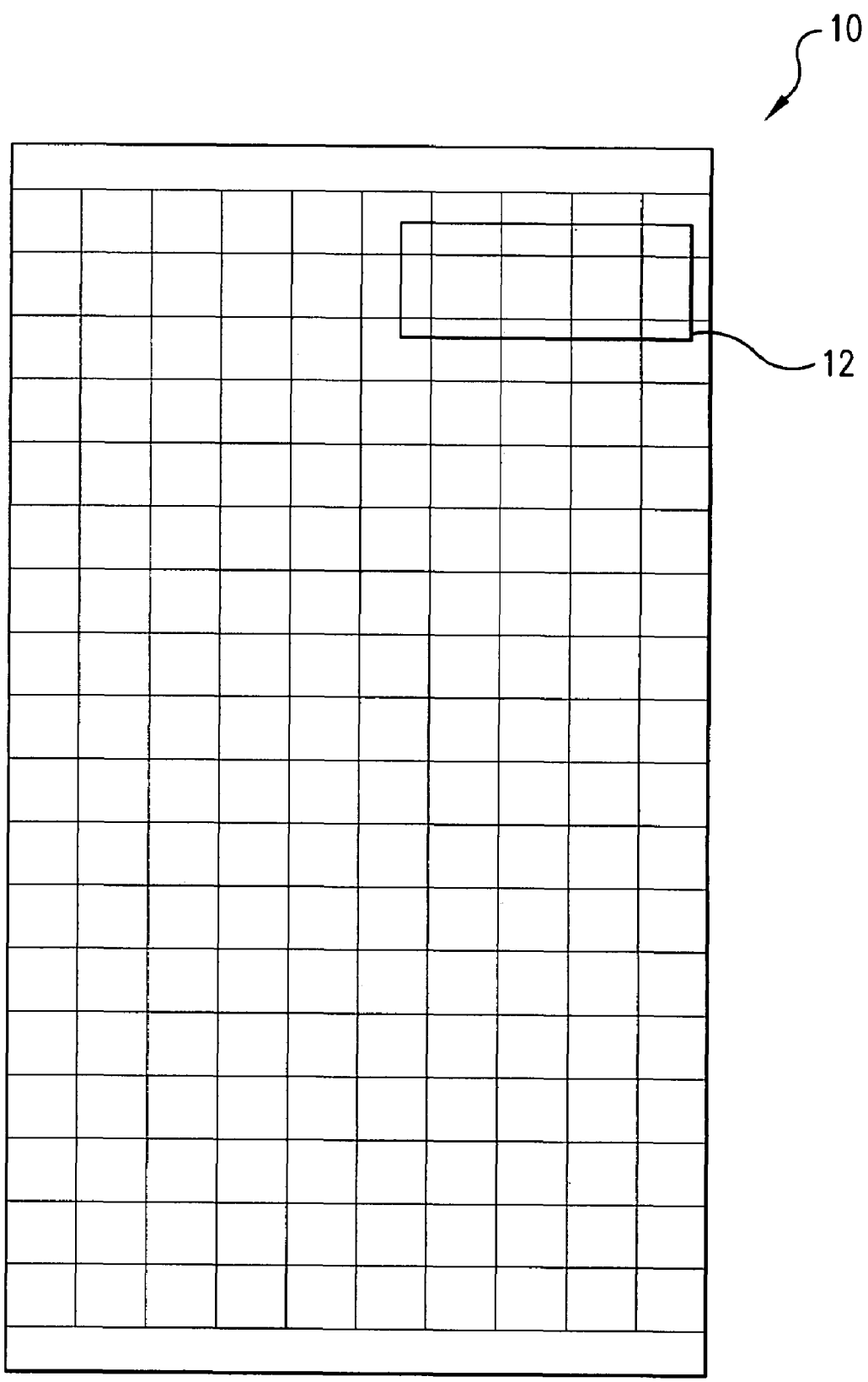
FIG. 1 is a top view of a handling tray supporting fuel elements to be incorporated into a nuclear fuel rod.

Referring to FIG. 1, a handling tray 10 is illustrated. The handling tray 10 provides a housing by which nuclear fuel elements, in the illustrated embodiment fuel pellets 12, are transported for ultimate incorporation into open end nuclear fuel clad. The handling tray 10 is made of a hardened corrosion resistant material, such as stainless steel compatible with nuclear materials.

Figure 2:
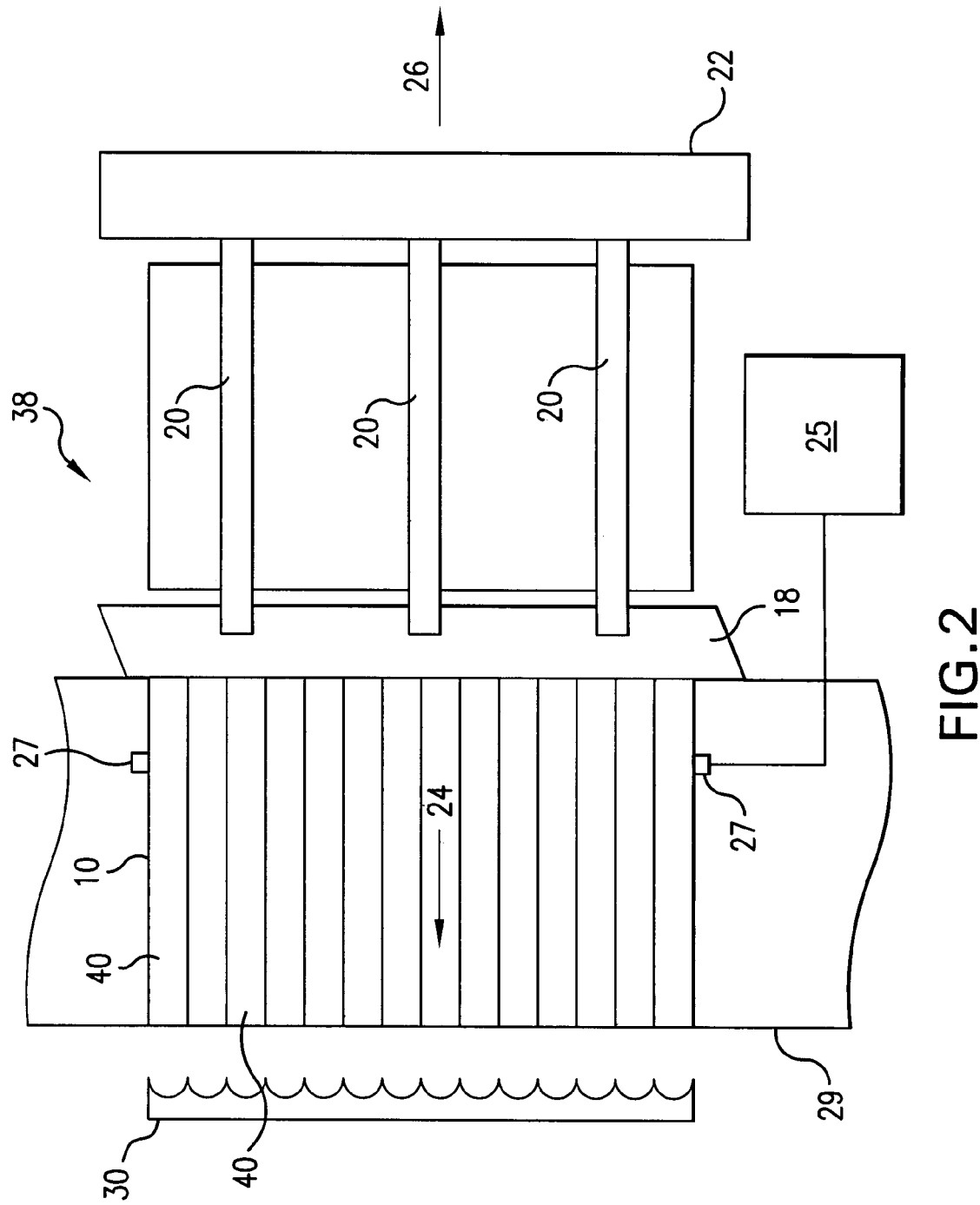
FIG. 2 is top perspective view of a pushing blade system for offloading nuclear fuel elements into the fuel plate transfer unit.

Referring to FIG. 2, a handling tray 10 enters an unloading area 38 where nuclear fuel pellets 12 are to be inserted into the fuel plate transfer unit 30. A hydraulic actuator 22 provides a motive force which causes supports 20 to extend in direction 24. The hydraulic actuator 22 is activated through the instruction of a computer 25, which has sensors 27 that indicate the presence of a handling tray 10. At a first end of the supports 20, a pushing blade 18 is positioned at a height which contacts the fuel pellets 12 in the handling tray 10 along the individual rows 40. The blade 18, in the example embodiment illustrated, is a flat bottom device. In an alternate embodiment of the present invention, the blade 18 has a scalloped edge. The blade 18 and the associated supports 20 move in direction 24 to push the fuel pellets 12 off of the tray 10. At the completion of the pushing of the fuel pellets 12 off of the tray 10, the blade 18 is then lowered by the hydraulic actuator 22 such that the edge contacts the tray 10. The actuator 22 may be any unit that provides movement of the supports 20 and the associated blade 18. As such, the actuator 22 may be an electromechanical device, a geared device or other similar arrangement. The actuator 22 may also be configured with a failsafe design to limit the imposition of force upon the fuel elements during pushing. To this end, the actuator 22 may be configured with a trip circuit that disconnects actuation of the power to the actuator if force is measured by the actuator to be above a predefined amount. The blade 18 is then moved in a tray removal direction 26. The impact of the blade 18 on the tray 10 removes the tray 10 from the conveyor belt 29. The tray 10 may then be stacked for further usage at another time. The conveyor belt 29 may then be indexed by the computer 25 to provide another handling tray 10 into the loading area The process of unloading fuel elements may then be repeated as often as desired. In the illustrated embodiment provided, a handling tray may be loaded every approximately 15 seconds.

A new tray 10 may then be moved into place along the roller system such that the pushing blade 18 is in a renewed position to push additional fuel pellets into the fuel plate transfer unit 30.

Figure 3:
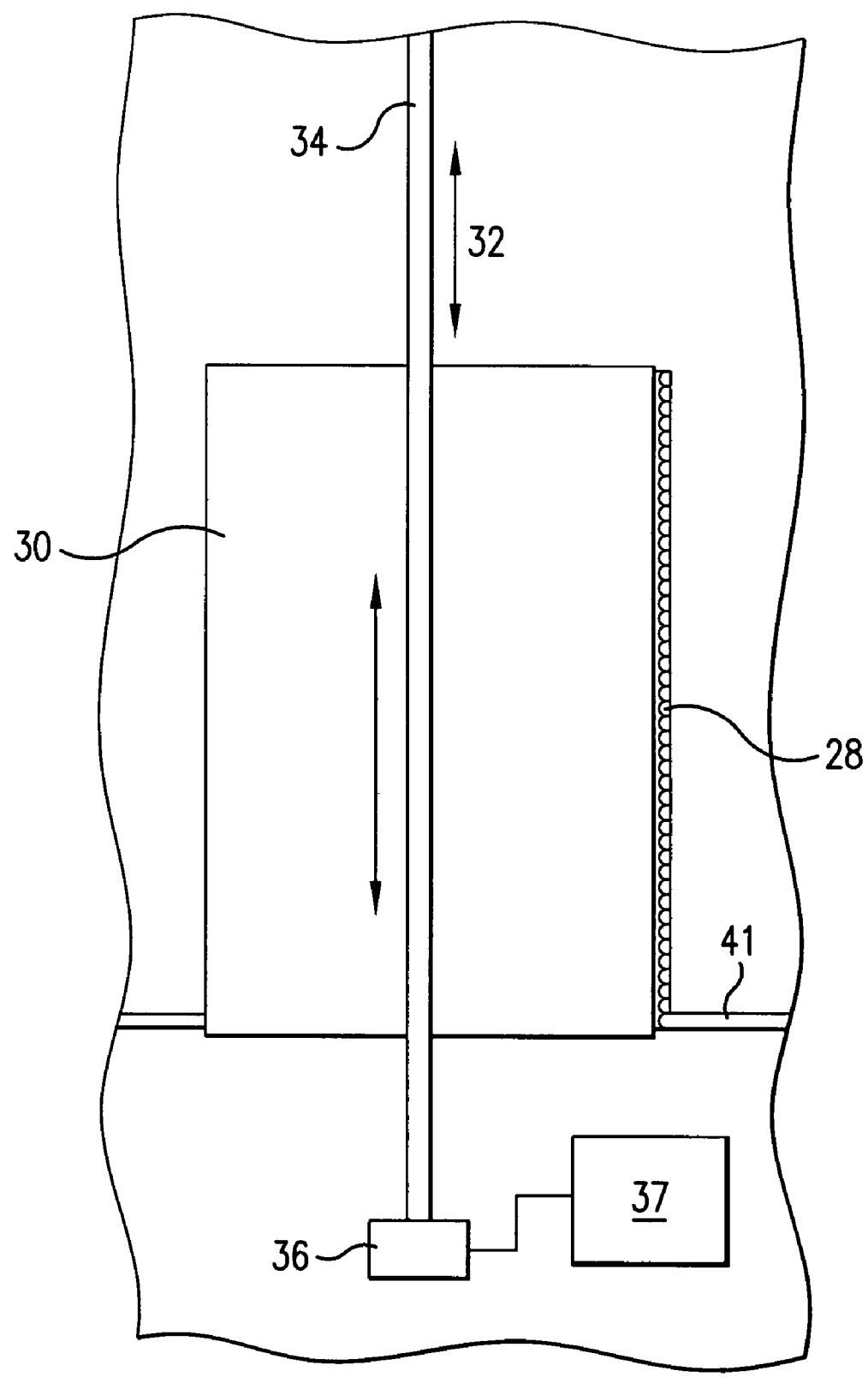
FIG. 3 is a top view of a fuel plate transfer unit and associated drive unit.

FIG. 3 is a top view of a fuel plate transfer unit 30. The fuel plate transfer unit 30 accepts fuel pellets 12 pushed by the combination of the hydraulic actuator 22 and the pushing blade 18. The fuel plate transfer unit 30 has fuel element rows 28 which correspond to the fuel elements placed upon the handling tray 10. Once the individual fuel elements are loaded into the fuel plate transfer unit rows 28, the individual fuel elements are then removed from the element rows 28 through indexing of the fuel plate transfer unit 30. The indexing of the fuel elements from the bottom of the fuel plate transfer unit 30 occurs along the indexing direction 32. The indexing occurs through the use of a motor 36 in conjunction with a rail 34. A slot 41 placed below the fuel plate transfer unit 30 allows the individual fuel elements rows to fall from the side of the fuel plate transfer unit 30 into the slot 41. The pellets are then transferred down the slot 41 through the use of a belt 42. The number of rows in the fuel plate transfer unit 30 and the tray 10 may be augmented such that larger or smaller batches of fuel elements 12 may be processed through the pellet loading apparatus. The fuel plate transfer unit 30 is indexed along direction 32 by the motor 36 through a ball screw connection. The ball screw is driven through motors controlled by a computer 37. Although illustrated as a chain driven motor arrangement, other methods of operation such as hydraulic movement of the fuel plate transfer unit 30 are possible. The length of the rail 34 is such that the fuel plate transfer unit 30 can index all rows of fuel pellets into the single slot 41.

Figure 4:
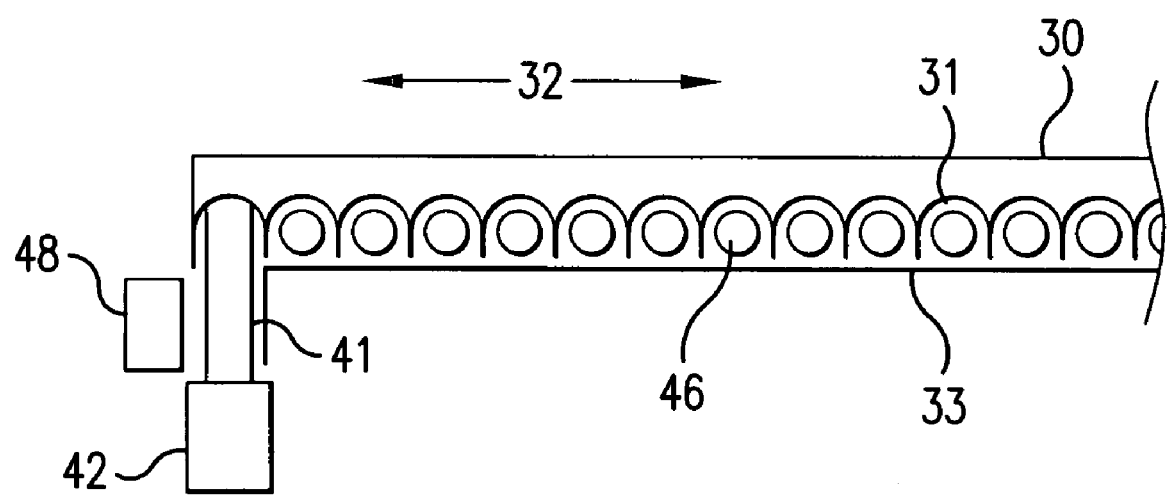
FIG. 4 is a side view of the fuel plate transfer unit and associated drive unit.

Referring to FIG. 4, a side elevational view of the fuel plate transfer unit 30 is illustrated. The fuel plate transfer unit 30 indexes along direction 32 such that individual fuel elements 46 fall from the underside of the fuel plate transfer unit 30. The rotational belt 42 accepts fuel pellets 46 falling from the fuel plate transfer unit from the slot 41. A fuel pellet block 48 protects the alternate side of the slot 41 such that the individual fuel elements 46 directly drop into the slot 41 and onto the rotational belt 42. The individual fuel elements 46 are housed in openings 31 placed in the fuel plate transfer unit 30. The openings 31 are sized to allow the fuel elements 46 to roll along an interfacing surface 33, but also keep individual fuel pellets from interacting with other fuel pellets during the indexing. Both the surface of the openings 31 and the interfacing surface 33 are configured as smooth surfaces to limit damage to the fuel elements 46. The width of the slot 41 is minimized to restrict the amount of movement of the fuel element 46 along the indexing direction 32. The depth of the slot 41 is also chosen such that fuel elements which transfer to the belt surface do not interfere with the indexing of the fuel plate transfer unit 30 during further indexing operations. Additionally, the speed of the rotational belt is maintained at levels that do not cause the fuel element 46 which transfers to the belt surface to jump do to sudden impartation of force. Although illustrated as a rectangular slot configuration, the slot 41 may also have an hourglass design to limit the possibility of fuel elements from being ejected from the surface of the belt 42 and back to the fuel plate transfer unit 30. The illustrated embodiment is intended for use on a level floor. If the pellet loading apparatus is to be used on a non-level surface, the belt 42 can be provided with protection for fuel element slide back by increasing the coefficient of friction between the fuel element and the belt. An example of this is placing a rubber coating on the belt 42. The belt 42 can be configured to assess material weight placed on the belt 42. Additionally, the belt 42 may have a belt speed sensor and a microprocessor-based integrator to continuously compute the rate of materials transferred along the entire length of the conveyor per unit time. The belt 42 surface can be maintained in a taught configuration through a screw take-up system 51 which maintains a desired spacing between the individual rollers 52. Although the loads handled by the belt 42 are anticipated to be light, impact idlers may be added in the impact area of the slot 41 to minimize belt deflection during loading. To additionally keep the belt surface taught, carrying idlers 53 can be accommodated along the entire space between the rollers 52. A take up weight 55 is also located along the belt 42 to keep the top surface of the belt 42 in a taught condition under increasing and decreasing speeds as well as changes in temperature and humidity.

Figure 5:
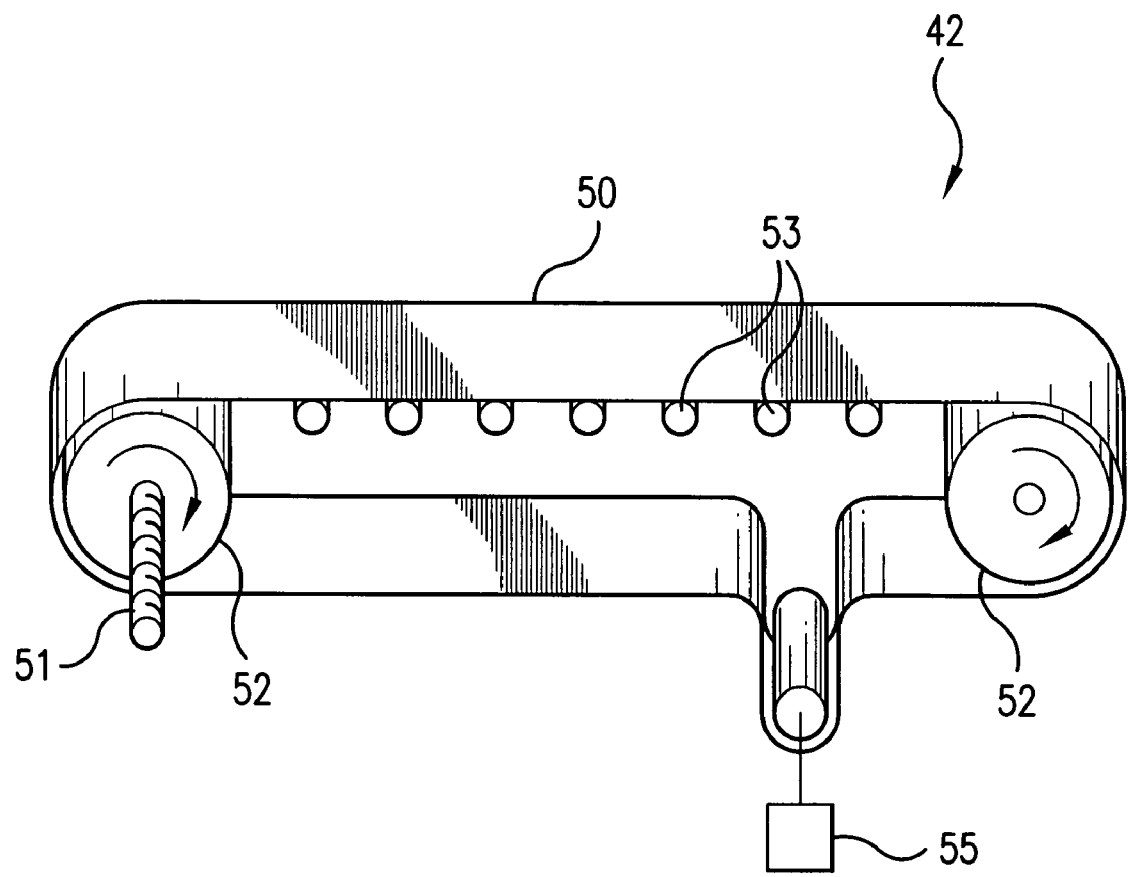
FIG. 5 is a side perspective view of a transfer belt for unloading a fuel plate transfer unit.

Referring to FIG. 5, the rotational belt 42 is illustrated in more detail. The rotational belt 42 is an endless loop of material 50 which is driven by motor driven rollers 52. The motor driven rollers 52 are controlled through a controller, such as a computer. The speed of the motor driven rollers 52 and the rotational belt 42 may be a constant speed or may be variable according to the needs of the process. The endless loop of material 50 is provided to safely transfer ceramic tile fuel elements along the length of the rotational belt 42 without damage. In the example embodiment illustrated, the rotational belt may be a PVC matrix belt, a rubber track belt, or other arrangement which provides a non-maring surface to contact the individual fuel elements.

Figure 6:
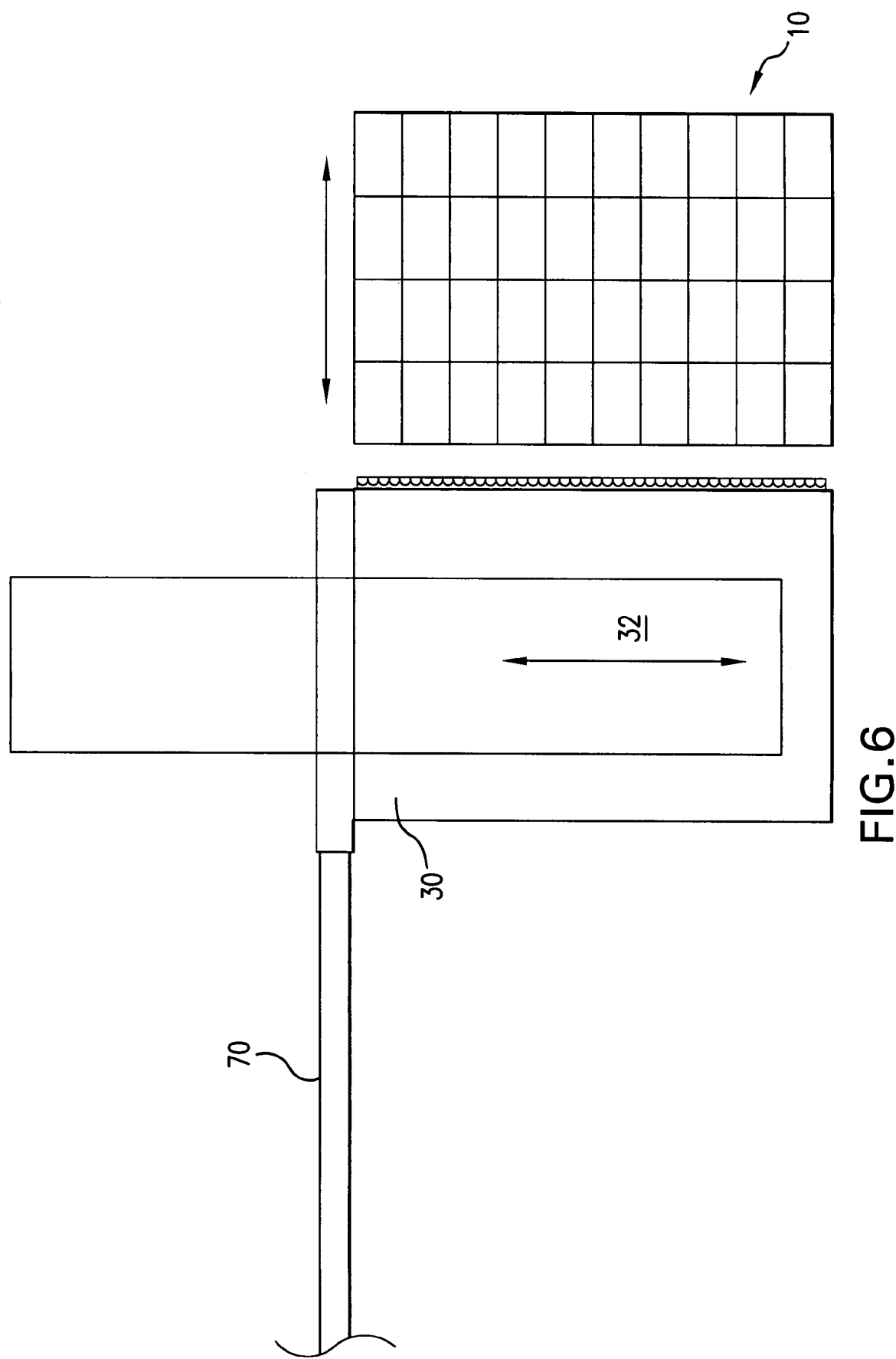
FIG. 6 is a top view of a juxtaposition of a transfer belt and a fuel plate transfer unit for use in transferring fuel elements to a loading area.
Figure 7:
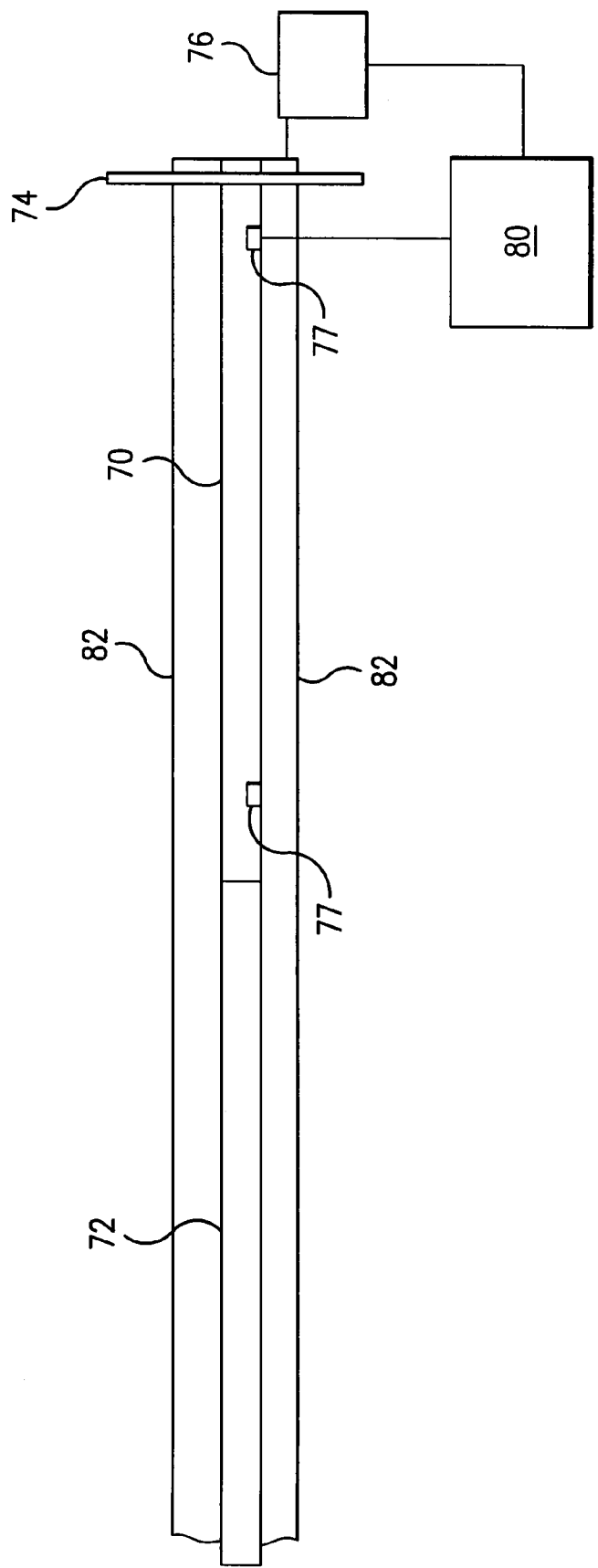
FIG. 7 is a top view of a rod loading device.

Referring to FIGS. 6 and 7, individual fuel elements are stacked to make up the full fuel rod pellet column by the rotational belt 42 and are then loaded into a fuel element transfer apparatus 70. The fuel element transfer apparatus 70 accepts the individual fuel elements in a line progression to form a fuel column. The fuel column is then transported from the fuel element transfer apparatus 70 into an open ended fuel clad 72 placed in the fuel element transfer apparatus 70. A blade 74 operated by a motor 76 pushes the fuel column down the fuel element transfer apparatus 70 and into the fuel clad 72. The blade 74 and the motor 76 are controlled by a computer 80 which has positional sensors 77 indicating the amount of fuel elements within the fuel element transfer apparatus 70. Instructed by the computer 80, the motor 76 is activated and the blade 74 transfers the fuel column into the open ended fuel clad 72. The fuel element transfer apparatus 70 is constructed such that the fuel column can be pushed into the fuel clad 72 without damage or need for lifting of the fuel elements. The blade 74 travels along guides 82 thereby allowing the blade 74 to maintain a perpendicular orientation to the fuel column placed within the fuel element transfer apparatus 70.

The method and apparatus of the present invention provide significant advantages over conventional methods and apparatus to load nuclear fuel pellets into fuel rod cladding. The present method and apparatus of the present invention allow an individual fuel rod to be loaded with nuclear fuel material with a typical cycle time of 30 seconds. Conventional cycle times for pellet loaders have a typical cycle time of approximately 45 seconds.

The method and apparatus of the present invention provide for loading of nuclear fuel rods such the elements making up the fuel column are not damaged by hard loading. Furthermore, the present invention reduces radiation exposure for workers constructing nuclear fuel rods due to the increased loading speed. Airborne contamination is reduced since open rod loading eliminates pressure buildup as the pellet column is inserted (gas escape over fuel column.)

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are accordingly to be regarded in an illustrative rather than in a restrictive sense.

What is claimed is:

1. A method to load a nuclear fuel rod, comprising:
    providing an apparatus for loading the nuclear fuel rod, the apparatus comprising:
    a fuel plate transfer unit, having an underside, the underside having openings for nuclear fuel pellets;
    an interfacing surface on which nuclear fuel pellets in the openings of the underside of the fuel plate transfer unit can roll; and
    a rotational belt positioned to accept nuclear fuel pellets that fall from the interfacing surface and the underside of the fuel plate transfer unit, the rotational belt positioned to transfer the nuclear fuel pellets into a fuel rod cladding open on both ends;
    providing nuclear fuel pellets housed in the openings in the underside of the fuel plate transfer unit, wherein the openings are sized to allow the nuclear fuel pellets to roll along the interfacing surface while keeping the nuclear fuel pellets from interacting with one another;
    transferring the nuclear fuel pellets from the fuel plate transfer unit in a fuel pellet column onto the rotational belt;
    indexing the nuclear fuel pellets in the fuel pellet column to a nuclear fuel pellet loading machine; and
    transferring the fuel pellet column from the rotational belt into the fuel rod cladding.

2. The method to load a nuclear fuel rod according to claim 1, wherein the transferring of the nuclear fuel pellets from the fuel plate transfer unit to the rotational belt is through a slot in the interfacing surface.

3. The method to load a nuclear fuel rod according to claim 1, wherein the openings and the interfacing surface are configured as smooth surfaces.

4. The method to load a nuclear fuel rod according to claim 1, wherein the transferring of the nuclear fuel pellets from the fuel plate transfer unit to the rotational belt is by indexing a row of the fuel pellets in the fuel plate transfer unit over a slot in the interfacing surface over the rotational belt, and transferring the column of fuel pellets onto the rotational belt through the slot in the interfacing surface.

5. The method to load a nuclear fuel rod according to claim 1, wherein the transferring of the nuclear fuel pellets from the rotational belt into the fuel rod cladding is through a fuel element transfer apparatus.

6. The method to load a nuclear fuel rod according to claim 1, further comprising:
    verifying a length of the fuel pellet column after the step of indexing the nuclear fuel pellets in the fuel pellet column to a nuclear fuel pellet loading machine.

7. The method to load a nuclear fuel rod according to claim 1, further comprising: welding a lower end plug on the lower end of the cladding.

8. The method to load a nuclear fuel rod according to claim 7, further comprising: welding a top end cap on the top end of the cladding.

* * * * *